(12) United States Patent
Reddick

(10) Patent No.: US 7,144,609 B2
(45) Date of Patent: Dec. 5, 2006

(54) ARTIFICIAL TURF SYSTEM

(75) Inventor: Randolph S. Reddick, Calhoun, GA (US)

(73) Assignee: U.S. Greentech, Inc., Calhoun, GA (US)

( * ) Notice: Subject to any disclaimer, the term of this patent is extended or adjusted under 35 U.S.C. 154(b) by 248 days.

(21) Appl. No.: 10/811,737

(22) Filed: Mar. 29, 2004

(65) Prior Publication Data

US 2004/0247802 A1    Dec. 9, 2004

Related U.S. Application Data

(63) Continuation-in-part of application No. 10/422,129, filed on Apr. 24, 2003, now Pat. No. 6,884,509.

(51) Int. Cl.
*A41G 1/00*     (2006.01)
*A01N 3/00*     (2006.01)

(52) U.S. Cl. ................. 428/17; 428/15; 428/25; 428/26; 428/85; 428/95; 428/542.6; 473/278; 405/38; 273/DIG. 13; 139/391

(58) Field of Classification Search .............. 428/15, 428/17, 25, 26, 542.6, 85, 95; 405/38; 473/278; 139/391; 273/DIG. 13
See application file for complete search history.

(56) References Cited

U.S. PATENT DOCUMENTS

| | | | |
|---|---|---|---|
| 3,003,643 A | 10/1961 | Thomas | |
| 3,795,180 A | 3/1974 | Larsen | |
| 4,188,154 A | 2/1980 | Izatt | |
| 4,268,551 A | 5/1981 | Moore, Jr. | |
| 4,356,220 A * | 10/1982 | Benedyk ................. | 428/17 |
| 4,462,184 A | 7/1984 | Cunningham | |
| 4,497,853 A | 2/1985 | Tomarin | |
| 4,749,479 A | 6/1988 | Gray | |
| 4,913,596 A | 4/1990 | Lambert, III | |
| 4,934,865 A | 6/1990 | Varkonyi et al. | |
| 5,017,040 A | 5/1991 | Mott | |
| 5,064,308 A | 11/1991 | Almond et al. | |
| 5,076,726 A | 12/1991 | Heath | |
| 5,250,340 A | 10/1993 | Bohnhoff | |
| 5,306,317 A | 4/1994 | Yoshizaki | |
| 5,383,314 A | 1/1995 | Rothberg | |
| 5,460,867 A | 10/1995 | Magnuson et al. | |
| 5,688,073 A | 11/1997 | Brodeur et al. | |
| 5,752,784 A | 5/1998 | Motz et al. | |
| 5,780,144 A | 7/1998 | Bradley | |
| 5,820,296 A | 10/1998 | Goughnour | |
| 5,823,711 A | 10/1998 | Herd et al. | |
| 5,848,856 A | 12/1998 | Bohnhoff | |
| 5,908,673 A | 6/1999 | Muhlberger | |
| 6,221,445 B1 * | 4/2001 | Jones .......................... | 428/17 |
| 6,818,274 B1 * | 11/2004 | Buck et al. ................. | 428/87 |

* cited by examiner

*Primary Examiner*—Jennifer C. McNeil
*Assistant Examiner*—Aaron Austin
(74) *Attorney, Agent, or Firm*—McNair Law Firm, P.A.

(57) ABSTRACT

An artificial turf system which includes a support layer, a base layer, and an outer layer. The support layer comprises an area of selected size and composition. The base layer comprises at least one grid which consists of a plurality of interconnected cells. The base layer is positioned over the support layer. Each cell forming the grid comprises an upstanding tubular member which includes an upper portion, having a first diameter, and a lower portion having a second diameter. The lower cell portion provides the cell with vertical flexibility. The plurality of cells provide the grid with selected vertical movement on contact providing the artificial turf system with improved softness.

44 Claims, 7 Drawing Sheets

ARTIFICIAL TURF SYSTEM

CROSS REFERENCE TO RELATED APPLICATION

This application is a Continuation-In-Part of application Ser. No. 10/422,129, filed Apr. 24, 2003 now U.S. Pat. No. 6,884,509, the subject matter of which is incorporated herewith.

BACKGROUND OF THE INVENTION

Artificial turf systems are old and well known. The original systems had the problem of losing their resiliency over a substantially short period of time, after which they became unsatisfactory for certain uses. Another factor which creates problems is that certain fillers are not fire proof, and in fact, will burn which creates a fire hazard. Finally, certain fillers contain dust and when used indoors, tend to pollute the atmosphere.

Accordingly, it is an object of the instant invention to provide an artificial turf system which is evenly resilient throughout.

Another object of the instant invention is to provide an artificial turf system which retains its resiliency over an extended period.

Another object of the invention is the provision of a filler which does not pack or mound.

Another object of the invention is the provision of a filler which retains its porosity.

Another object of the invention is an artificial turf system which includes a grid which is deformable to follow the contour of the support surface.

Another object of the invention is an artificial turf system which includes a grid with vertical resiliency.

Another object of the invention is an artificial turf system with improved wearability.

Another object of the invention is an artificial turf system with improved safety.

SUMMARY OF THE INVENTION

The instant invention is directed to an artificial turf system which includes a support layer, a base layer, and an outer layer. The support layer comprises an area of selected size which may consist of smoothed sand, compacted soil, fiber reinforced soil, gravel, asphalt, concrete or a combination thereof.

The base layer comprises at least one grid which consists of a plurality of interconnected cells arranged over the support layer. Each cell of the cells forming the grid comprises an upstanding tubular member having an upper portion, of a first diameter which functions to support the outer layer and a lower portion of a second diameter, which functions to engage with the support layer. The lower portion provides the cell with vertical flexibility, which provides the artificial turf system with vertical movement during use. This vertical movement improves the ability of the turf system to absorb downward forces or impacts.

The support layer may comprise an upper and a lower layer with the upper layer consisting of a stabilizer sheet, which is preferably waterproof and is positioned over the lower layer. The lower layer may comprise compacted soil, gravel, asphalt, concrete or a combination thereof.

Each grid has a polygonal shape which is preferably square or rectangular. The cells are formed of a semi-rigid plastic. The cells forming each grid are interconnected with resilient securing members which allow relative movement between adjacent cells, i.e. vertical and longitudinal movement. The securing members are formed integral with the lower portions of the cells and are preferably diamond shaped. The securing members may be formed in other polygonal shapes.

Preferably, the upper portion of each cell is circular and includes vent holes. The lower portion is preferably cone shaped and extends downwardly and outwardly from the upper portion. The lower portion is formed to include larger diameters than the upper portion.

Each of the securing members is formed of synthetic rods of filaments shaped into a desired configuration and engaged with the associated cells at the points or corners formed where the rods or filaments engage or are united.

Selected outer ones of the grid forming cells include outwardly disposed fingers formed with the securing members. These fingers are adapted to engage with connectors formed with certain outer cells of adjacent grids. The fingers and connectors allow a plurality of grids to be interconnected forming a mat of desired size and shape.

The base may include a transition layer arranged over the mat or grids. The transition layer may be comprised of a grate formed of at least two arrays of substantially diagonally arranged synthetic rods or filaments. The arrays of rods may be formed integral. Each of the rods may be circular and of differing sizes. Additionally, the transition layer preferably includes a porous felt secured over at least one surface of the grate. Alternatively, each surface of the grate may be covered with a felt. The felt is preferably between 4 and 10 oz. per square yard and made of polypropylene. Other synthetic filaments may be used.

The outer layer includes pile secured with a backing fabric which is preferably supported on the transition layer. The pile may also be secured with a foam backing with the foam backing which may be supported directly on the upper surface of the mat. A filler is spread evenly over the pile fabric to cover the surface of the backing fabric and surround and cover desired portions of the pile tufts. It is preferred that the filler is STF (coated silicone dioxide particles) or STF and ground rubber.

A base layer for use with an artificial turf system. The artificial turf system also comprises a support layer, and an outer layer. The base layer includes a flexible mat formed of a plurality of inter-connected grids. Each grid comprises a plurality of interconnected vertically disposed multi-diameter cones arranged in a polygonal configuration. Each cone is formed of a semi-flexible plastic and is configured to include an upper portion with an upper edge and a lower portion with a lower edge. The upper edge is adapted to engage with and support the outer layer and the lower edge is adapted to engage with the support layer. The cones forming grids are constructed to provide relative flexibility between the support layer and the outer layer which flexability provides the turf system with increased flexibility and shock absorption capability.

Each cell preferably is about 1" in length, with the upper portion having a diameter of about 2.5". The lower portion extends downwardly and flares outwardly from the upper portion in cone shaped manner to a diameter of about 3.5". The lower portion extends from or is positioned relative to the upper portion at an angle of about 75° of vertical. The lower portion may be continuous or it may comprise a plurality of radially extending fingers. Likewise the upper portion may be continuous or it may include a plurality of vents. Also, there may be provided a plurality of inwardly directed flexible fingers extending from the upper edge.

Each securing member is structured to be capable of elongating, compressing and flexing, which allows the grid to conform with the contour of the support surfaces on which it rests. Preferably the securing members are formed of synthetic filaments configured in a diamond shape.

The cells forming the grids are axially spaced by about 4" and are generally retained in this relationship by the securing members.

The base layer includes a semi-flexible transition layer, which is positioned on the upper edges of the grid forming cells. The transition layer comprises a semi-flexible plastic grate or screen which may or may not be covered on one or more surfaces with a porous felt. Preferably the felt is secured with the semi-flexible plastic grate.

The outer layer comprises a backing fabric which supports pile tufts of between ¼" to 4" in length and is formed of synthetic ribbons of between about ¹⁄₃₂" to ⅜" in width. The backing fabric may include a porous synthetic backing which secures the pile tufts with the backing fabric.

A filler which comprises polished silicon dioxide particles or beads of substantially equal size is interspersed over the backing fabric to fill about the tufts up to at least half their length. The filler allows the outer layer to retain its porosity.

The silicon dioxide beads may be colored one of brown, green, red, and black, they may comprise a combination of these colors or they may be natural color. The silicon dioxide beads range in size between 8 and 60 mesh. The silicon dioxide beads are substantially round so as not to present sharp edges. The filler beads are sized to be within about five mesh sizes and are spread over the pile tufts evenly to a depth of between 0.25 to 2.00 inches.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Referring now in more detail to the drawings, the invention will now be described in more detail.

The artificial turf system is designed to be usable for many different purposes such as sports surfaces, landscaping, equine facilities and the like. The sports surfaces include playgrounds, ball fields and track facilities. In order to function in these areas the artificial turf system must be of proper firmness, be durable, have proper drainage capability, and be easily installed. In the case of sport and equine facilities, it is also necessary that the turf system have proper abrasiveness, traction, flame retardance and not present fungicidal problems. It is also most necessary that the surface not pack or mound unnecessarily.

Figure 1:
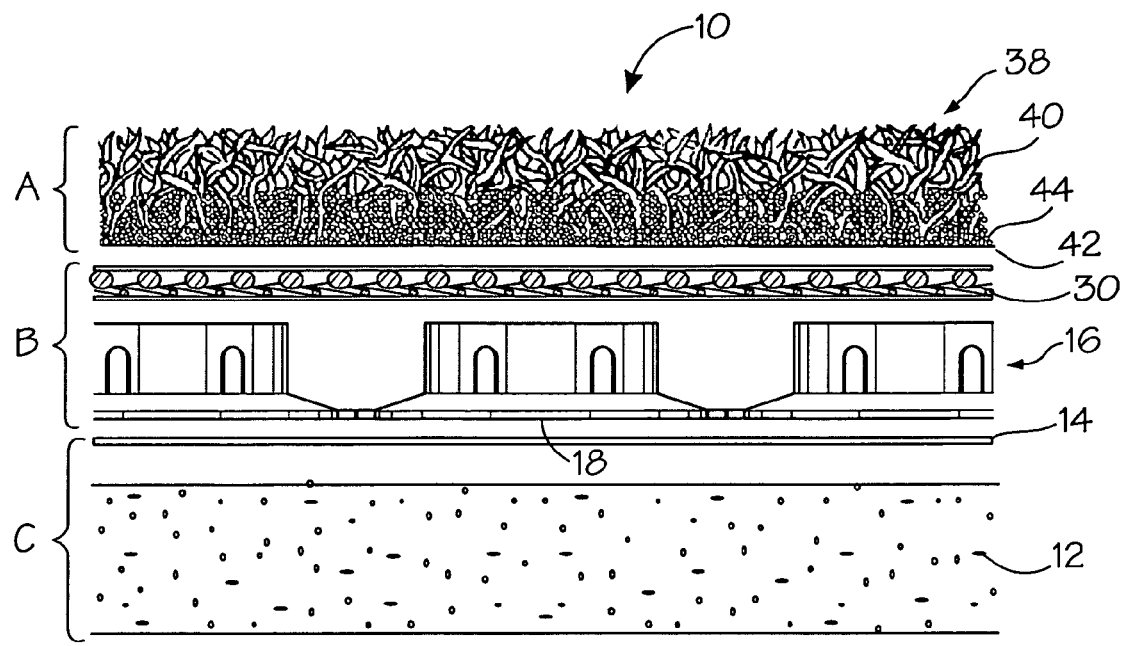
FIG. 1 is an exploded cutaway side view of a first arrangement of the artificial turf system of the invention.
Figure 2:
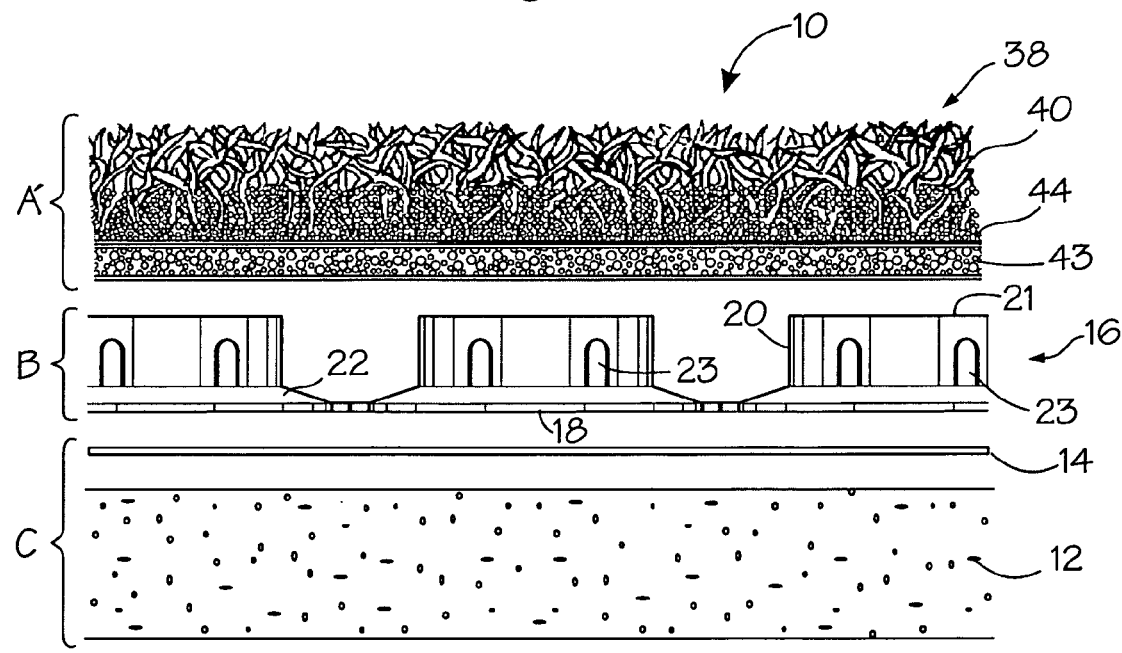
FIG. 2 is similar to FIG. 1, showing a second arrangement of the turf system of the invention.
Figure 3A:
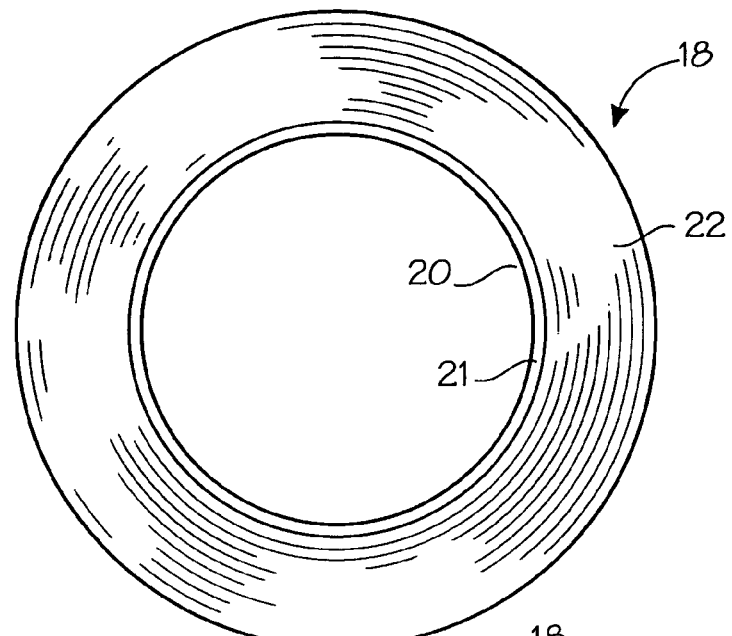
FIG. 3a is a top view of a cell.
Figure 3B:
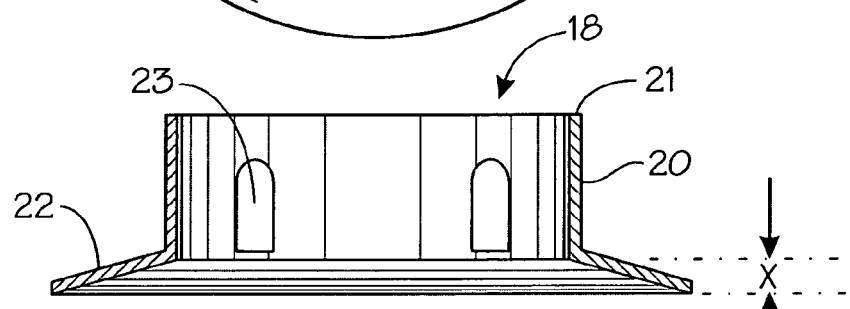
FIG. 3b is a cutaway side view of a cell.
Figure 3C:
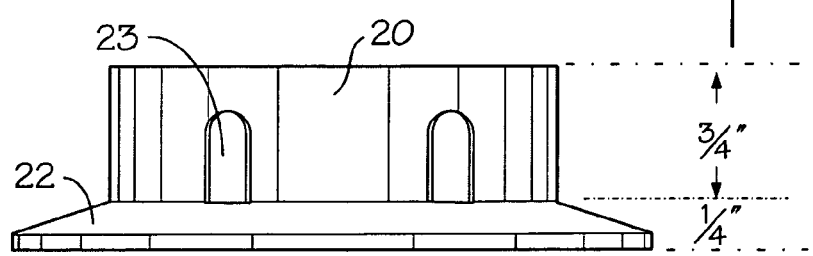
FIG. 3c is a cutaway side view of a cell.
Figure 4:
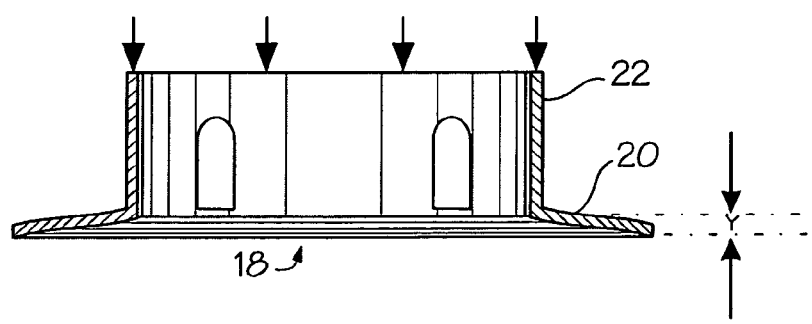
FIG. 4 is a cutaway side view of a cell compressed.

Turning now to FIGS. 1 and 2, the artificial turf system of the invention 10 is shown broken into three components i.e. outer layer A, base layer B and support layer C.

Support layer C may be no more than compacted soil or it may be comprised of crushed stone, crushed stone and sand, asphalt, concrete or a combination thereof. This layer is identified as support base 12.

It may be desirable to place a stabilizer sheet 14 over layer 12. Stabilizer sheet 14 is a flexible non-porous plastic sheet which assists with drainage and provides a stabilizing support for grid 16.

Turning now to FIGS. 1–5 and 9, base layer B is positioned over and supported by support layer C. Base layer B includes mat 15 which is made up of a plurality of grids 16 connected together. Mat 15 is preferably formed to conform with the shape of support layer C. There could be a plurality of mats laid side by side over an extremely large support layer.

Each grid 16 is formed of a plurality of interconnected cells 18 which comprise cylinders formed of semi-rigid or semi-flexible plastic. Grids 16 are preferably formed rectangular or square, however, any polygonal shape is acceptable. Each cell 18 includes a circular upper section 20 and lower section 22.

Upper section 20 has an upper end 21 which may be is designed to engage with outer layer A. Vents 23 are formed about the periphery of the upper section to allow hot air to exit the cylinder.

Lower section 22 extends radially downward and outward from the lower end of upper section 20 forming a cone shaped lower section. Lower section 22 extends from the vertical axis of the cell at an angle of about 75°. Lower section 22 may have a continuous radial surface or it may be in the form of a plurality of radially extending members. In either instance, lower section 22 provides resilience or movement in the vertical direction when the cell is impacted with weight. The degree of downward movement from its normal height x to a compressed height y or between ¹⁄₁₆ and ⅛ inch.

Cylinder 18 preferably extends vertically to about 1" in height with the upper portion being bout ¾" and the lower portion about ¼".

Grids 16 comprise a plurality of cells 18 which are interconnected by securing members 24. The securing members engage with adjacent cell peripheries, preferably the lower edge of lower section 22. The cells forming a grid are arranged along opposed axes with each axis being separated by about 4".

Figure 5:
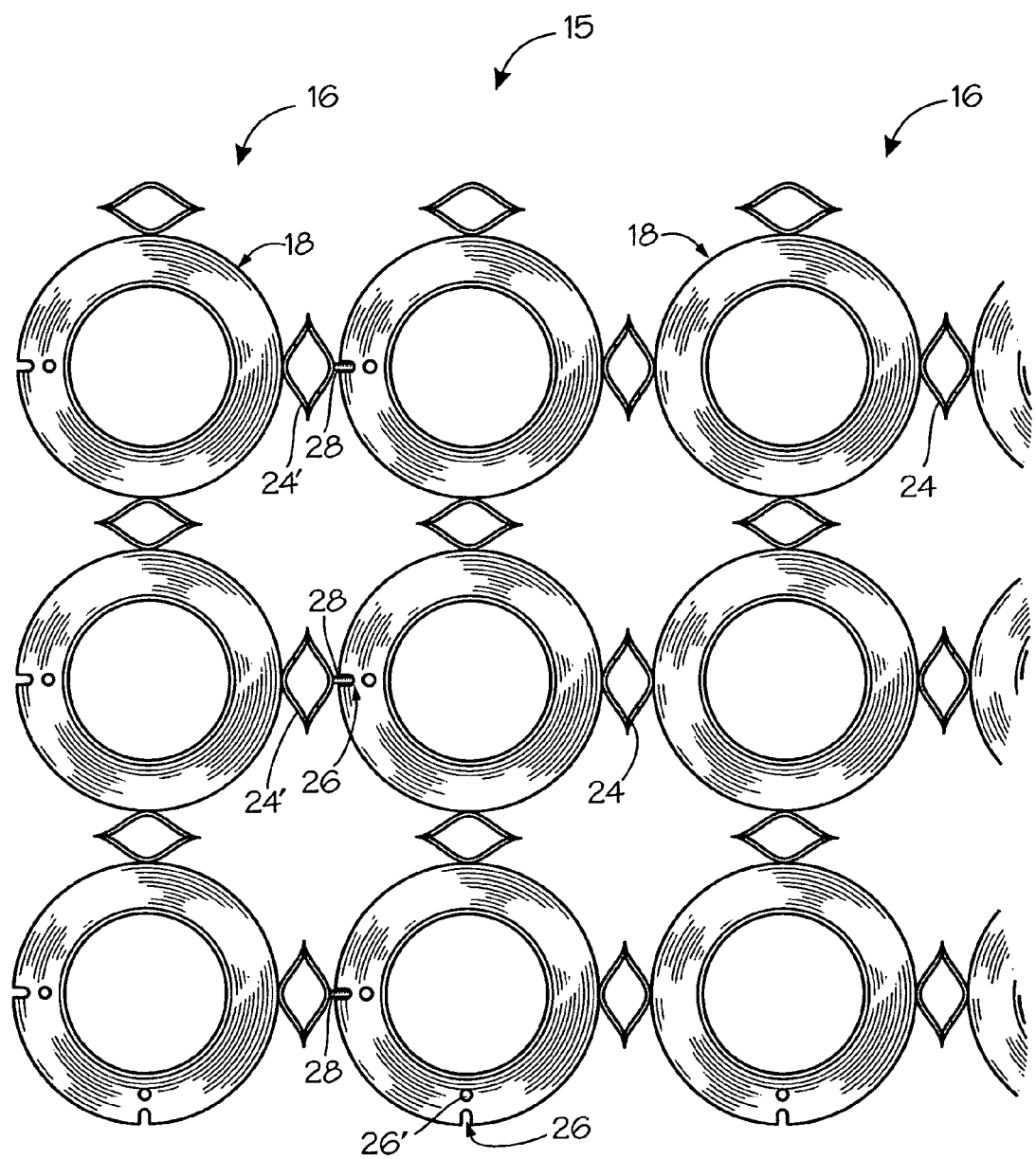
FIG. 5 is a cutaway top view of a grid.
Figure 6:
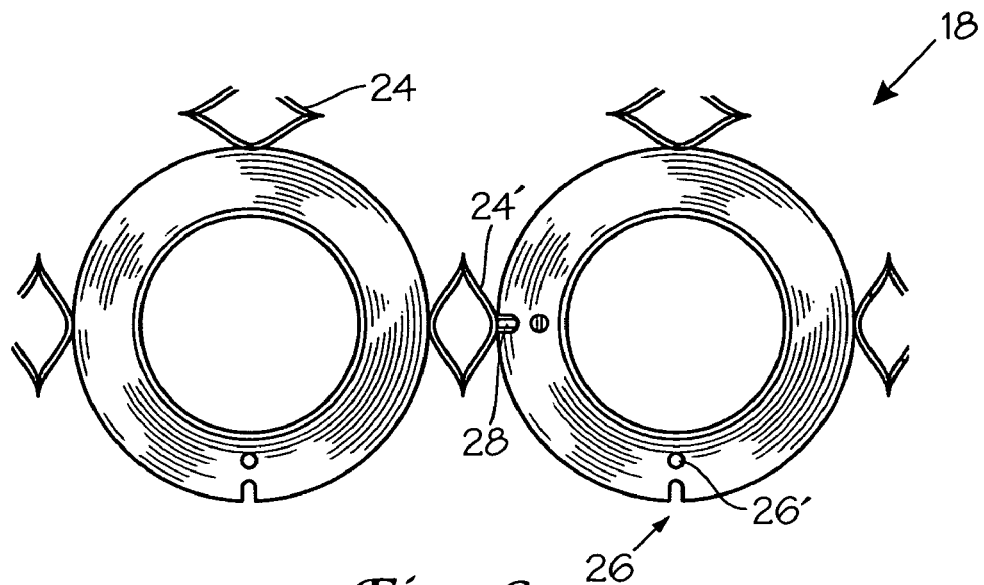
FIG. 6 is a cutaway top view of cells of adjacent grids interconnecting.

Securing members 24 are generally diamond shaped and comprise flexible synthetic filaments or rods interconnected into spaced positions. The filaments of the securing members where connected form an angle with the adjacent cells 18 as shown in FIG. 5. Securing members 24 are flexible and allow vertical, diagonal and horizontal movement between the adjacent cells. This flexibility allows the cells forming the grids to conform with the topography of the support layer, insuring even engagement between each cell and the support layer.

As shown in FIGS. 5–8, two outer sides of each cell 18 include securing members 24' which are directed away from the grid. Attached to the outer extremity of each securing member 24' is an L-shaped finger 28.

On the opposing two outer sides of grid 16, each cell 18 is provided with a connector 26.

Figure 7:
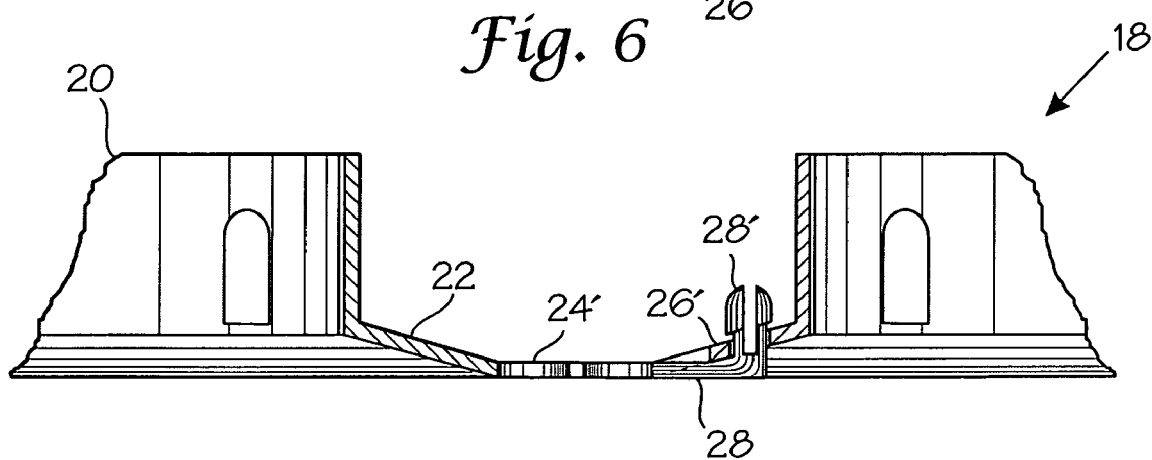
FIG. 7 is a cutaway side view of a securing member of the system.
Figure 8:
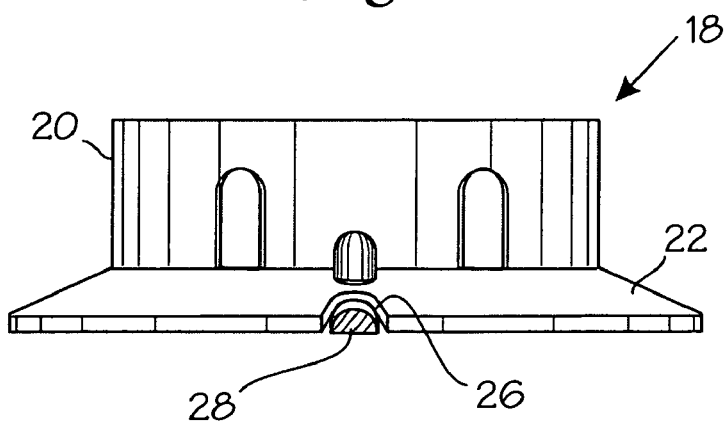
FIG. 8 is a cutaway side view of the finger of the securing members.
Figure 9:
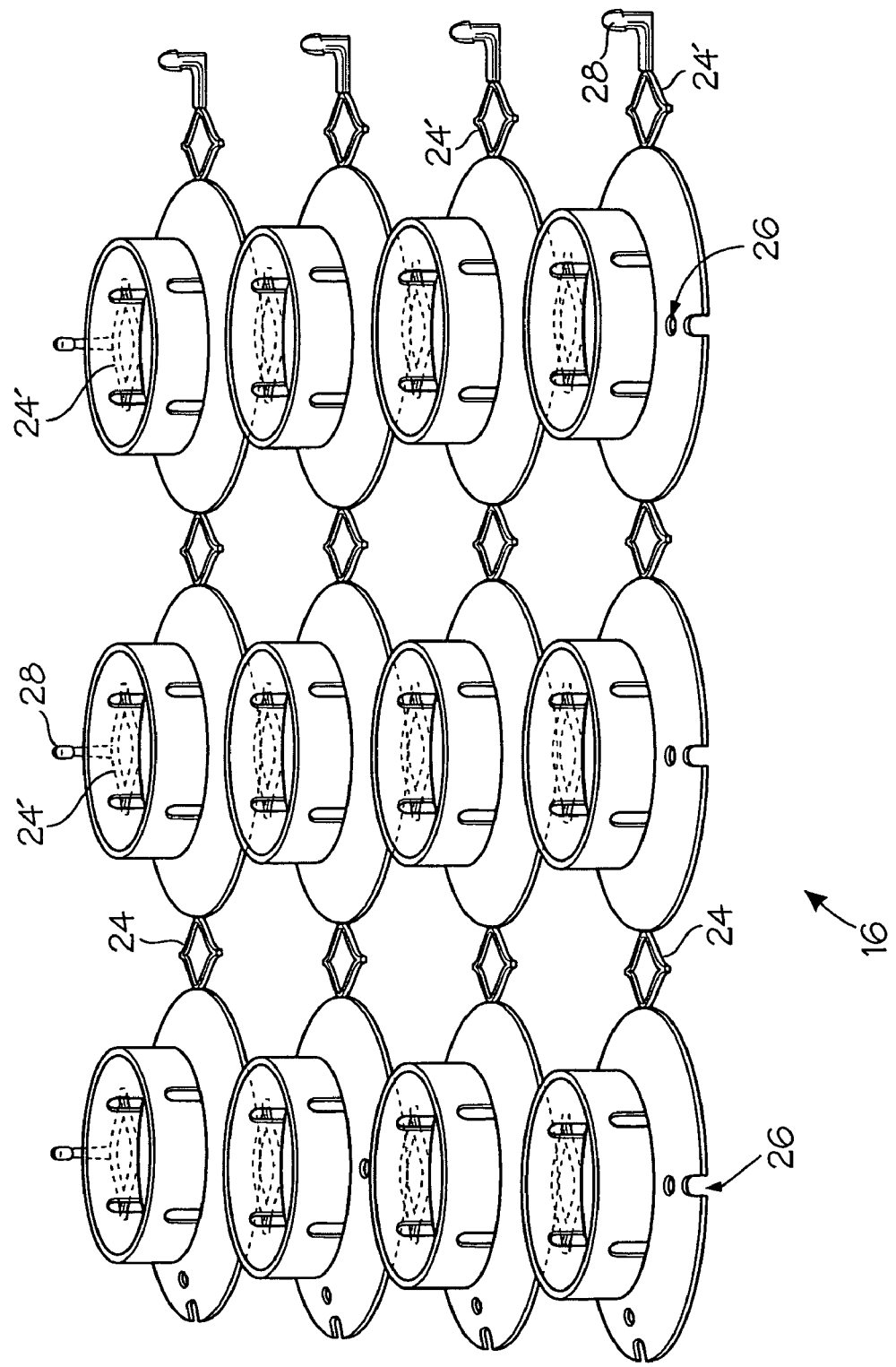
FIG. 9 is a perspective view of a grid.

Connectors 26 comprise a slot and a spaced aperture as shown best in FIGS. 7–8.

The horizontal extension of finger 28 is adapted to engage in the slot of connector 26 while the vertical portion 28' of finger 28 extends through opening 26' locking finger 28 in fixed position with lower portion 22 of the associated cell. The vertical portion 28' of finger 28 may include a slot and a lip providing flexability and a shoulder which engages about opening 26'.

In use, grids 16 are integrally formed, preferably by molding in the manner above described. A plurality of grids 16 are interconnected forming a matt 16 or a plurality of mats which then are placed over support layer C. The lower ends of lower portions 22 are positioned in engagement with support layer 12 or with stabilizer sheet 14.

Figure 10:
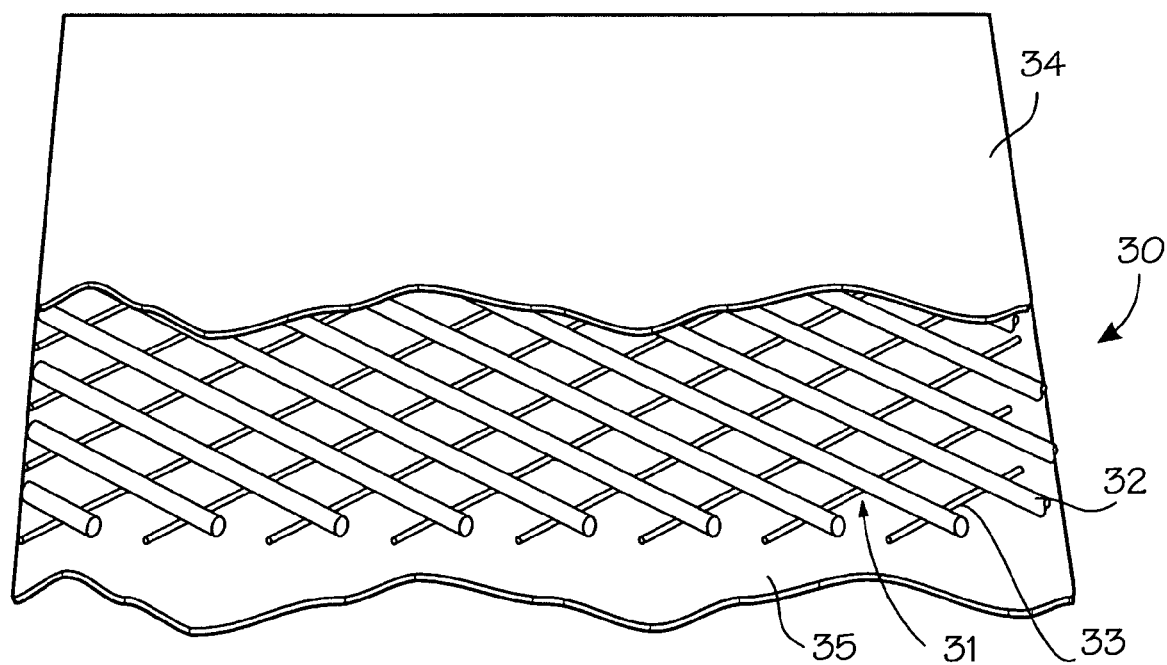
FIG. 10 is a cutaway perspective view of the transition layer.

In certain instances base layer B includes a transition layer 30 as best shown in FIGS. 1 and 10. Transition layer 30 preferably consists of a screen or grate 31 which is formed of diagonally disposed synthetic rods or filaments 32, 33. Generally rods 32 are of larger diameter than rods 33, however, this is not necessarily so. It is preferred that screen 31 is preferably a unitary molded unit sized to match the grid size. They could be made in larger sheets and cut to size. Also they could be synthetic filaments bonded together. It is only necessary that screen 31 be sufficiently rigid to assist the cells in supporting the outer layer and yet provide sufficient vertical give to improve the resilience against impact of the artificial turf system.

Preferably felts 34, 35 are formed of synthetic yarns and are positioned over and secured with the top and bottom surfaces of screen 31. Felts 34, 35 are formed to be between 4 and 10 ounces per square yard. The felts must be sufficiently porous to provide drainage from the outer layer through the base layer. The transition layer primarily assists in providing uniform vertical support of the outer layer while the felts provide padding which assists in reducing wear between the outer layer and the tops of the coils.

Turning now to FIGS. 1, 2, 11 and 12, the outer layer A comprises a pile fabric 38 which consists of pile tufts 40 secured with base fabric 42.

Pile tufts 40 are preferably formed of polyethylene, polypropylene, nylon or a combination. The tuft forming synthetic filaments have a ribbon like cross-section of between about $1/32"$ to $3/8"$ in width. The pile tufts are formed to a height, which may be uniform or may vary, of between $1/4"$ to $4"$. The pile tufts are secured with backing fabric 42, 43 by tufting, weaving, braiding or bonding as desired.

The backing fabric may be a porous textile fabric as shown in FIG. 1 at 42. A porous backing is applied to retain the tufts with backing fabric 42. With this backing fabric it is desirable that transition layer 30 be positioned between the backing fabric and mat 15. Alternatively, the backing fabric may comprise a $1/2"$ composite of foam and fabric sleet as shown in FIG. 2 at 43. Backing 43 is preferably a polyurethane, polyethylene or latex sheet between 1 and 2 cm thick. In this instance, it is normally not necessary to provide transition layer 30 as backing 43 provides sufficient vertical resilience. In both instances, it is desirable that the backing fabric be porous.

A filler 44 is distributed evenly over backing fabric 42, 43 and about pile tufts 40. The filler is applied to a depth of between 0.25 to 2.00" depending upon the need.

Figure 11:
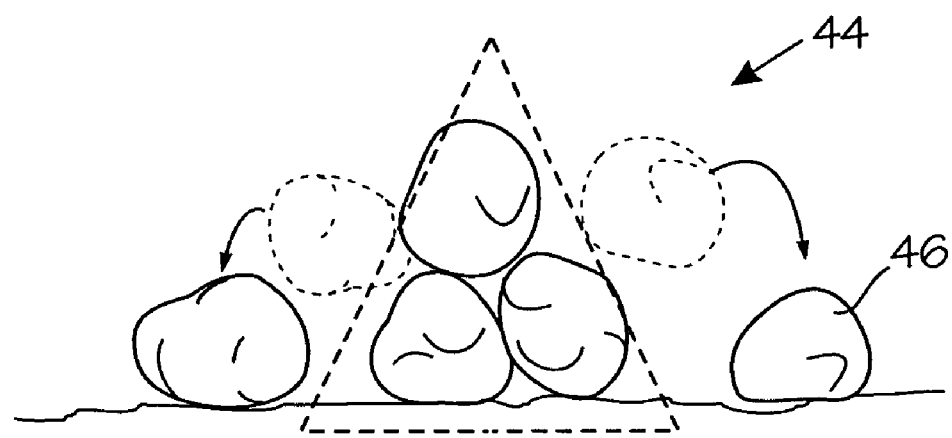
FIG. 11 is a diagrammatic view of the filler of the invention illustrating its non-mounding qualities.
Figure 12:
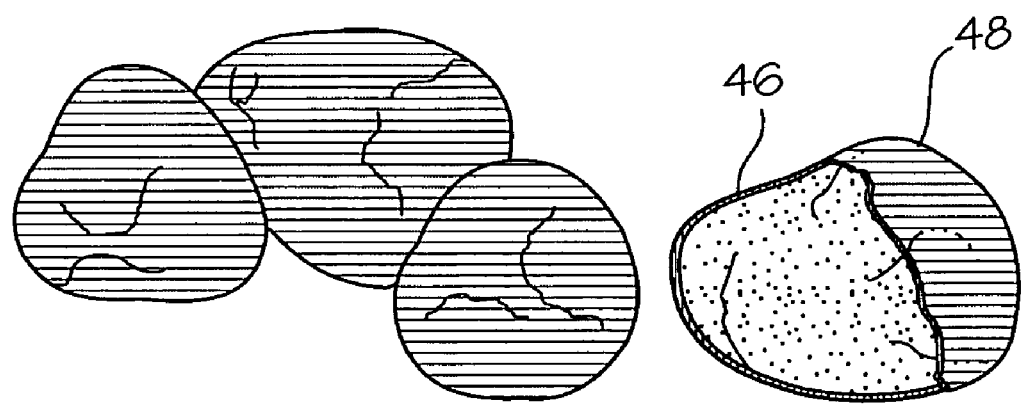
FIG. 12 is a perspective view of the shape of the filler particles.

It has been found that a filler of silicone dioxide beads or particles, which may be coated as shown in FIGS. 11 and 12, are most desirable. These beads or particles are substantially round with no sharp edges. They are sized and cleaned to be between 8 and 60 mesh and are substantially dust free. Due to the roundness of the particles of silicone dioxide this filler does not pill or mound, maintaining an angle of repose of about 30°. This feature assists tremendously in maintaining even porosity, maintaining a constant G-force factor and maintaining an even surface.

Silicone dioxide beads 46 are slightly porous and in certain instances it is desirable to coat the outer surfaces thereof with an acrylic sealer 48 as shown in FIG. 12. Other sealers may be used if desired. The coated silicone dioxide particles or beads are also referred to as STF.

It may also be desirable to color the silicone beads to enhance the appearance of the artificial turf. Desirable colorants are iron oxide (Fe Oz) for black and chrome (iii) oxide ($Cr_z O_3$) for green. Other natural colorants are available for other colors or shades.

Generally three pounds of colorant are mixed with one gallon of acrylic sealer to form the coating although this ratio is changed to alter the depth of the color as desired.

It is noted that satisfactory results have been achieved when using mixtures of silicone dioxide beads mixed with ground rubber or with sand.

Artificial turf systems when installed must be sufficiently stable so as to maintain a generally even outer surface. These systems must also be resilient within limits so that the stability of the surface is sufficiently hard so as to provide positive footing and yet is sufficiently resilient to provide sufficient give so as to not cause undue injury.

There have been tests developed to determine the physical capabilities of artificial turf system. One such accepted test determining the resiliency or shock absorbing capability of artificial turf is conducted by TSI Testing Services Inc. of Dalton, Ga. TSI Testing Service conducts tests which reveal the G-max of an artificial turf system when installed and the G-max after extended time or use.

For an artificial turf system to be acceptable, the G-max must be and remain within the range of 90 to 120.

The test conducted on the artificial turf system above described provided test results indicating that the system as installed possessed a G-max of about 100 and as such is at a very acceptable level of hardness. Continued testing over time, which equates with extended use, resulted in an initial increase in G-max of between 5 and 14%, and generally about 7%. The synthetic turf system of the invention retained this G-max through extended further testing. A G-max of between 105 and 114 is most acceptable.

Other artificial turf systems using sand or ground rubber have also been tested by TSI. The results of these tests indicated an initial G-Max of about 100. However, with continued testing over time, the G-Max of these products was shown to continuously increase up to between 25 and 40%. This increase in the G-Max indicates that these tested turf systems, in a short space in time, degraded to the point of becoming unsatisfactorily hard, requiring replacement.

While a preferred embodiment of the invention has been described using specific terms, such description is for illustrative purposes only, and it is to be understood that changes and variations may be made without departing from the spirit or scope of the following claims.

What is claimed is:

1. An artificial turf system which includes a support layer, a base layer, and an outer layer, comprising:
    an area of selected size and composition comprising said support layer;
    at least one grid consisting of a plurality of interconnected cells arranged over said support layer comprising said base layer;
    each cell of said cells comprises an upstanding tubular member having an upper portion and a lower portion;
    said upper portion having a first diameter and is adapted to support said outer layer, said lower portion having a second and larger diameter and is adapted to engage with said support layer;
    said lower portion providing each said cell with vertical flexibility; whereby,
    said at least one grid is capable of selected vertical movement due to impact, providing said artificial turf system with improved softness and shock absorption.

2. The artificial turf system of claim 1 wherein said support layer is substantially planar and comprises at least one of compacted sand, dirt, concrete, gravel and asphalt.

3. The artificial turf system of claim 1 wherein said support layer comprises an upper layer which includes a stabilizer sheet and a lower layer which includes soil, concrete, gravel and asphalt, said upper layer being positioned over said lower layer.

4. The artificial turf system of claim 1 wherein each said cell is formed of semi-rigid plastic.

5. The artificial turf system of claim 1 wherein said grid is shaped to be preferably one of square and rectangular.

6. The artificial turf system of claim 1 including resilient securing members interconnecting adjacent of said cells of said grid, said securing members allowing relative movement between said cells.

7. The artificial turf system of claim 6 wherein said securing members are integral with said lower portion of adjacent of said cells.

8. The artificial turf system of claim 6 wherein each said securing member is polygonal shaped.

9. The artificial turf system of claim 6 wherein each said securing member is diamond shaped.

10. The artificial turf system of claim 6 wherein said securing members comprise shaped synthetic filaments.

11. The artificial turf system of claim 1 wherein said upper portion is of uniform diameter and includes vent holes.

12. The artificial turf system of claim 1 wherein said lower portion is cone shaped and extends downwardly and outwardly from said upper portion.

13. The artificial turf system of claim 1 wherein said grid is integrally formed.

14. The artificial turf system of claim 1 wherein said base includes a transition layer arranged over said grid.

15. The artificial turf system of claim 14 wherein said transition layer comprises a grate formed of at least two arrays of substantially diagonally arranged synthetic filaments.

16. The artificial turf system of claim 15 wherein said filaments are integral.

17. The artificial turf system of claim 15 wherein said filaments are circular and of different sizes.

18. The artificial turf system of claim 15 wherein said transition layer includes at least one layer of porous felt secured over at least one surface.

19. The artificial turf system of claim 18 wherein said felt is between 4 oz. and 10 oz. per square yard.

20. The artificial turf system of claim 15 wherein each array of said filaments is disposed along a single plane.

21. The artificial turf system of claim 15 wherein said filaments forming different of said arrays are of different sizes.

22. The artificial turf system of claim 14 wherein said outer layer includes pile tufts secured with a backing fabric, said backing fabric resting on said transition layer.

23. The artificial turf system of claim 1 wherein said outer layer includes pile tufts secured with a foam backing, said foam backing resting on said cells.

24. The artificial turf system of claim 1 wherein said outer layer comprises a pile fabric with filler surrounding said pile.

25. The artificial turf system of claim 24 wherein said filler is STF.

26. A base layer for use with an artificial turf system which further includes a support layer and an outer layer, said base layer including:
    a flexible mat, said mat comprising a plurality of inter-connected grids, each said grid comprising a plurality of inter-connected vertically disposed multi-diameter cells arranged in a polygonal configuration;
    each said cell being formed of a semi-flexible plastic and includes an upper portion with an upper edge for supporting said outer layer and a lower portion with a lower edge for engaging with said support layer, each said cell being constructed to provide relative flexibility between said upper and lower portions; whereby
    said base layer provides said turf system with support and vertical resilience against impact.

27. The base layer of claim 26 wherein each said cell is about 1" in length.

28. The base layer of claim 26 wherein said upper portion has a constant diameter of about 2.5" and said lower portion extends downwardly and outwardly from said upper portion to a maximum diameter of about 3.5".

29. The base layer of claim 28 wherein said lower portion extends from said upper portion at an angle of about 75° of vertical.

30. The base layer of claim 28 wherein said lower portion includes a plurality of radially extending members.

31. The base layer of claim 26 wherein said upper portion includes a plurality of vents.

32. The base layer of claim 26 wherein said upper edge includes a plurality of inwardly directed flexible extensions.

33. The base layer of claim 26 including resilient securing members engaging outer edges of said cells.

34. The artificial turf system of claim 33 wherein selected outer ones of said securing members include outwardly directed fingers.

35. The artificial turf system of claim 34 wherein said outwardly directed fingers are adapted to interconnect with a connector formed on selected outer cells of an adjacent grid, whereby a plurality of said grids may be interconnected forming a mat.

36. The base layer of claim 33 wherein each of said securing members is capable of elongating, compressing and flexing.

37. The base layer of claim 33 wherein said securing members comprise shaped synthetic filaments.

38. The base layer of claim 33 wherein said securing members are polygonal shaped.

39. The base layer of claim 26 wherein each said grid forming cell has a vertical axis and adjacent vertical axes of said plurality of grid forming cells are spaced by about 4".

40. The base layer of claim 39 including a semi-flexible transition layer, said transition layer being arranged on upper edges of said grid forming cells.

41. The base layer of claim 40 wherein said transition layer includes a semi-flexible plastic grate.

42. The base layer of claim 40 wherein said transition layer includes a porous felt layer.

43. The base layer of claim 42 wherein said felt layer is secured with a semi-flexible plastic grate.

44. The base layer of claim 43 wherein said felt layer comprises a felt on upper and lower sides of said grate.

* * * * *